United States Patent [19]

Laura et al.

[11] Patent Number: 4,729,791

[45] Date of Patent: * Mar. 8, 1988

[54] CORROSION-INHIBITING COATING COMPOSITIONS FOR METALS

[75] Inventors: Paul E. Laura, Southport, Conn.; Paul W. Niemczura; Harold H. Christhilf, both of Trainer, Pa.; Paul E. Morrison, New York, N.Y.

[73] Assignee: Witco Corporation, New York, N.Y.

[*] Notice: The portion of the term of this patent subsequent to Dec. 23, 2003 has been disclaimed.

[21] Appl. No.: 705,148

[22] Filed: Feb. 25, 1985

[51] Int. Cl.$^4$ .................. C04B 9/02; C08L 91/00
[52] U.S. Cl. .................. 106/14.23; 106/14.25; 106/14.29; 106/14.35; 106/14.36; 106/14.38; 106/245; 106/249; 106/264; 106/265; 427/388.1; 428/457; 524/166
[58] Field of Search .............. 106/14.23, 14.28, 14.29, 106/14.35, 14.36, 14.38, 260, 249, 245, 264, 265

[56] References Cited

U.S. PATENT DOCUMENTS

| | | | |
|---|---|---|---|
| 3,453,124 | 7/1969 | Wurstner | 106/285 |
| 3,492,231 | 1/1970 | McMillen | 106/274 |
| 3,565,672 | 2/1971 | Adams | 428/471 |
| 3,565,843 | 2/1971 | Kassinger et al. | 106/14.13 |
| 3,661,622 | 5/1972 | Rogers | 428/497 |
| 3,746,643 | 7/1973 | Rogers | 106/14.29 |
| 3,816,310 | 6/1974 | Hunt | 252/33 |
| 3,925,087 | 12/1975 | Lechner et al. | 106/285 |
| 4,495,225 | 1/1985 | Ciuba et al. | 427/236 |
| 4,631,083 | 12/1986 | Christhilf et al. | 106/14.23 |

Primary Examiner—Theodore Morris
Attorney, Agent, or Firm—Wallenstein, Wagner, Hattis & Strampel, Ltd.

[57] ABSTRACT

Coating compositions for metals effective to inhibit corrosion of ferrous and nonferrous metals susceptible to corrosion, said compositions comprising an inorganic-organic complex in the form of a thixotropic over-based alkaline earth metal sulfonate, particularly calcium, organic sulfonate, complexed with an alkaline earth metal, particularly calcium, carbonate; and linseed oil or a drying oil having drying properties generally similar to linseed oil, said linseed oil constituting at least 15% and, particularly, higher percentages up to about 50%, by weight of the coating compositions; and a drier, preferably of the paint drier type; and particularly advantageously also containing an epoxidized oil, particularly an epoxidized drying oil; and, also, such ingredients as mineral oils, waxes, petrolatums and resins.

23 Claims, No Drawings

CORROSION-INHIBITING COATING COMPOSITIONS FOR METALS

DESCRIPTION

1. Technical Field

Our present invention is concerned with the preparation of novel corrosion-inhibiting coating compositions which are effective, when applied in thin films, for the prevention or inhibition of corrosion or rusting of ferrous and non-ferrous metals which are susceptible to corrosion or rusting. The corrosion-inhibiting compositions of our invention (hereafter, for convenience, sometimes called "coating compositions") comprise formulations which contain certain proportions of inorganic-organic complexes, in the form of thixotropic overbased alkaline earth metal organic sulfonates complexed with alkaline earth metal carbonates, in admixture with certain proportions of drying oils, particularly linseed oil, generally with small proportions of driers, preferably of the type of paint driers. In their most advantageous or important embodiments, said coating compositions contain one or more additional ingredients, particularly more than one, selected from the group of epoxidized oils; petrolatums; oxidized petrolatums; waxes such as slack wax, and crude or refined microcrystalline waxes (non-oxidized or oxidized); resins; and the like. Said coating compositions can be in the form of (a) volatile organic solvent-based systems; (b) nonvolatile mineral oil-based systems; and (c) mixed volatile organic solvent - nonvolatile mineral oil-based systems. The thixotropic overbased alkaline earth metal organic sulfonates are advantageously derived from alkyl benzene sulfonic acids in which alkyl contains from 12 to 30 carbon atoms. These thixotropic overbased organic sulfonates comprise, most advantageously, complexes of calcium organic sulfonates with calcium carbonate. The coating compositions of this invention, on curing, form "hard" film coatings having a high permanence.

2. Background Prior Art

Over a period of a great many years, numerous coating compositions have been proposed, and many of which have been used commercially, for the coating of ferrous and non-ferrous metals, which are susceptible to rust or corrosion, to prevent or to inhibit such rust or corrosion. As has long been known, rust or corrosion is caused by environmental conditions, such as contact of the metal surfaces by water; by air, particularly moist air; and by various chemicals or other materials which come into contact with the metal surfaces. While, in most cases, ferrous metals such as iron and steels represent the areas where rust and corrosion problems are particularly encountered, various non-ferrous metals, for instance, aluminum, are also subject to corrosion. The corrosion-inhibiting compositions which have been suggested, or which have been or are currently being commercially used, fall, generally speaking, into two classes, one being compositions which form coatings in relatively thin films and which are soft, and are commonly of a character such that they may readily be stripped off or removed from the metal surfaces, for example, by organic solvents, where it is necessary to remove the coatings at periodic intervals to carry out repairs or the like on the metal surfaces, after which they are recoated; and the other comprises compositions which form coatings in relatively thin films and which are hard and of a character such that they are, and are intended as, essentially permanent coatings and are removable only with great difficulty.

Since the coating compositions of our present invention are of the type which involve the use of inorganic-organic complexes which, as noted above, comprise thixotropic overbased alkaline earth metal organic sulfonates complexed with inorganic alkaline earth metal carbonates, as one of the essential ingredients of said coating compositions, it is to be noted that the prior art has long known of such inorganic-organic complexes, and of corrosion-inhibiting coating compositions which contain, as one of the ingredients thereof, the aforesaid inorganic-organic complexes.

The use as corrosion-inhibiting coating compositions, which contain thixotropic, or grease-like or gel-like thixotropic, alkaline earth metal organic sulfonates complexed with alkaline earth metal carbonates, with or without admixture with polymers, resins, or waxes, in a carrier or diluent of nonvolatile or volatile (or mixtures of nonvolatile and volatile) hydrocarbons and/or other liquid solvents, is well-known to the art and is disclosed in such U.S. Pat. Nos. 3,925,087; 3,453,124; 3,492,231; 3,565,672; 3,565,843; 3,661,622; 3,746,643; and 3,816,310, and various patents referred to in the specifications of such patents. Various of such corrosion-inhibiting compositions are known to have a certain utility for a variety of purposes, some including float coating or flotation coating of the insides of tanks, e.g., ballast tanks for ships, barges, off-shore oil rigs, etc., wherein, for instance, the tank is filled with water, the lighter-than-water corrosion-inhibiting composition is poured onto the surface of the water, and the water is then drained from the tank, and the floating layer of anticorrosion agent deposits on the side walls and bottom of the tank as the water drains out. Other uses for various of said corrosion-inhibiting compositions include, for instance, automobile and truck body under-coatings, and others for use in other environments.

U.S. Pat. No. 3,925,087 discloses corrosion-inhibiting compositions which comprise (a) about 10 to about 30% by weight of a rust-inhibitive grease-like concentrate comprising a thixotropic inorganic-organic complex stably dispersed in an essentially inert liquid oily phase in an amount not to exceed 4 parts, per part of said complex, of said essentially inert liquid oily phase, said inorganic-organic complex comprising a thixotropic overbased alkaline earth metal, particularly calcium, organic sulfonate complexed with calcium carbonate; (b) about 2 to about 10%, by weight of a drying oil, particularly tung oil, said drying oil being miscible with a diluent oil selected from the group consisting of aliphatic hydrocarbon diluents, cycloaliphatic hydrocarbon diluents, aromatic hydrocarbon diluents, and mixtures thereof boiling at temperatures above 150° C.; and (c) from at least 60% by weight to essentially the balance of said compositions being a diluent oil selected from the group consisting of aliphatic hydrocarbon diluents, cycloaliphatic hydrocarbon diluents, aromatic hydrocarbon diluents, and mixtures thereof boiling at temperatures above 150° C.

The said U.S. Pat. No. 3,925,087 expressly states, in Column 6, Lines 36–43, that "too much of the drying oil apparently leads to the formation of cracks in the skin * * *." From 3 to 9% by weight of drying oil is adequate, 6–8% by weight being preferred.

The said U.S. Pat. No. 3,925,087 also makes reference, in Column 1, last paragraph, leading over through Line 21 of Column 2, to one commercial source of inorganic-organic complex compositions which comprise gel-like thixotropic overbased calcium organic sulfonates complexed with calcium carbonate, which compositions contain, or may contain, a petroleum resin or a wax or the like, all distributed throughout a hydrocarbon solvent. Reference is made to products commercially sold under the trademark "SACI", two of such "SACI" products, namely, "SACI"-200 and "SACI"-300, being specifically disclosed as exemplary of such "SACI" products. ("SACI" presently is a registered trademark owned by Witco Chemical Corporation, New York, N.Y.) Such "SACI" products are stated to constitute formulations containing the aforementioned thixotropic overbased calcium organic sulfonates complexed with calcium carbonate, namely, the inorganic-organic complexes used as one of the ingredients of the corrosion-inhibiting compositions of said U.S. Pat. No. 3,925,087, but that the "SACI" products generally are not the inorganic-organic complexes per se. The patent discloses the use of the "SACI"-200 and "SACI"-300 products, as they are commercially marketed and sold, in the production of the corrosion-inhibiting or rust-inhibiting compositions of said patent.

In Column 4, Lines 40-56, of said patent, it is pointed out that, since typical grease-like concentrates of the inorganic-organic complex, e.g., such as the "SACI" products, contain more than 25%, and typically 50-70%, by weight of the complex per se, the proportions of the essential ingredients of the corrosion-inhibiting compositions of the invention of said patent, can be restated as follows:

a. about 5 to 15% by weight of the inorganic complex;

b. about 2 to about 10% by weight of the drying oil; and c. essentially the balance to 100% (e.g., at least 75% by weight) of hydrocarbon oil diluent. It then states that the active ingredients, expressed in such manner, are in a complex/drying oil ratio of about 1:1-3:1; and that dilution of the active ingredients to, for example, the 50-300 cps level, permits deposition of at least about 1.0 gram of these active ingredients per square meter of metal to be protected.

The said U.S. Pat. No. 3,925,087 contains 25 Examples, exclusive of four Examples (C-1 to C-4) which contained only a "SACI" product and a naphthenic oil, without any drying oil, as Control Formulations; of the Nos. 1 to 25 Examples, some contain only a naphthenic oil solution of tung oil without any "SACI"; others contain a naphthenic oil solution of "SACI"-200, or "SACI"-300 (Examples 2 and 17-19) and tung oil with no drier, falling within the scope of the invention of said patent; others contain a naphthenic oil solution of "SACI"-200 and linseed oil, with or without driers, apparently falling within the scope of said invention; and others comprise a naphthenic oil solution of "SACI"-200, and tung oil in amounts of 20 and 30 wt. % of the formulation (Examples 14 and 15) and falling outside of the scope of the invention of said patent. The patent also states that the corrosion-inhibiting compositions of the invention thereof may contain petroleum resins or waxes, which may be added, or which may be present in the particular "SACI" product utilized, as, for instance, "SACI"-300 (see Column 1, last paragraph thereof, and Example 2). The compositions 14, 15 and 16, shown in the last paragraph of Column 8 of U.S. Pat. No. 3,925,087, disclose, respectively, the following formulations:

| Example | Ingredient In Percent By Weight | | |
|---|---|---|---|
| | Naphthenic Oil | "SACI" 200 | Tung Oil |
| 14 | 75.0 | 5.0 | 20 |
| 15 | 65.0 | 5.0 | 30 |
| 16 | 75.0 | 15.0 | 10 |

By reference to Table I in Column 10 of said patent, Saltspray Tests of the aforementioned Examples 14, 15 and 16 show time periods of 5, 6 and 28 hours, respectively, before Failure, which are tantamount to utter failure or inoperativeness of such compositions in corrosion resistance in standard Saltspray tests. Indeed, in the file wrapper contents of U.S. Pat. No. 3,925,087, in the AMENDMENT filed Mar. 10, 1975, in the first paragraph at Page 9 of said AMENDMENT, reference is specifically made to "increasing the proportion of tung oil" at the expense of the "SACI" also results "in rapid failure of the coating", specific reference being made to the aforesaid Examples 14–16 of said Patent. Indeed, even with as high as 10% of tung oil in admixture with the naphthenic oil and the "SACI" 200 (Example 16 of the Patent) Saltspray test failure occurred at the end of 28 hours which, as the same AMENDMENT states on the same Page 9 showed a "substantial falling off of the performance when the amount of drying oil exceeds the claimed maximum level" (to wit, 10% tung oil), it being asserted that the amount of tung oil be "about 10% or less, more preferably about 9% or less." Even Examples 5, 6 and 7 showed Saltspray test results which, from a practical standpoint, were commercially valueless in contrast to the corrosion-inhibiting compositions of Examples 1, 2 and 3, and other compositions presumably forming a part of the invention of said Patent but with hardly effective Saltspray test values.

The corrosion-inhibiting compositions of said patent are stated to form solid protective coatings which are soft or tacky, rather than brittle, and have little or no tendency to crack. They are stated to be particularly adapted for the coating of the inside of tanks and ar best applied by a flotation coating procedure, or by spraying, which comprise zero or minimal shear force methods of application of the corrosion-inhibiting compositions to the metal surface for coating the same, and that they possess the advantageous property of the entire protective coating on a metal surface of said corrosion-inhibiting compositions being easily stripped off with unheated degreasing solvents.

With further regard to the disclosures of the aforementioned prior art U.S. Pat. Nos. 3,453,124 and 3,565,843, said patents are disclosed as describing, illustratively, what said U.S. Pat. No. 3,925,087 refers to as the rust-inhibitive, grease-like concentrate comprising the thixotropic inorganic/organic complex stably dispersed in an essentially inert liquid oily phase constituent of the corrosion-inhibiting compositions of the invention of said U.S. Pat. No. 3,925,087. A more complete discussion of the disclosures of said U.S. Pat. Nos. 3,453,124 and 3,565,843, as well as the other above-cited patents, is believed to be here in order and is noted below.

U.S. Pat. No. 3,453,124 discloses, among other things, the preparation of inorganic-organic complexes in the form of thixotropic overbased alkaline earth metal (such as calcium) organic sulfonates complexed with alkaline earth metal (such as calcium) carbonates, dispersed, in the form of colloidal particles, in oil carriers such as mineral oils or other nonvolatile carriers or media, as well as other carriers or media which are volatile, such as mineral spirits, and, also, mixtures of nonvolatile and volatile carriers or media. It also discloses corrosion-inhibiting coating compositions for the treatment of ferrous and nonferrous metals which comprise, as essential components of the invention of said patent, reaction products of the aforesaid inorganic-organic complexes, colloidally dispersed in said carriers or media, with phosphoric acid esters of alcohols. In Column 40, Lines 48–75, of said patent, it is stated that particularly useful corrosion-inhibiting compositions are obtained when certain types of hydrocarbon resins are added to the aforesaid reaction products, in that said resins impart to the coating compositions the property of forming coatings on the metals which are firm rather than being soft and greasy, firm coatings being advantageous because they provide additional resistance to abrasion, dirt pickup, gravel pickup, etc.; and they avoid the disadvantages of soft grease-like coatings which are easily removed by contact of such coatings by humans and animals.

The said U.S. Pat. No. 3,453,124 also discloses, in Columns 43 and 44, the results of comparative corrosion tests with illustrative corrosion-inhibiting compositions of said patent and with commercial automobile undercoating compositions, which latter include a petrolatum undercoating composition; an undercoating composition comprising SAE 40 oil, a rust inhibitor, and a drying oil; a petroleum base translucent film; and an asphalt cutback undercoating composition; in which comparative tests of corrosion-inhibiting compositions made in accordance with the claimed invention of said patent are shown to be superior.

U.S. Pat. No. 3,492,231 discloses methods for the preparation of the inorganic-organic complexes, which can be used to prepare the novel corrosion-inhibiting compositions of the present invention, and also their utility in the production of corrosion-inhibiting compositions for use on metals.

U.S. Pat. No. 3,565,672 discloses methods for the preparation of mineral oil solutions of inorganic-organic complexes, which complexes are of the type which are used in accordance with the present invention, and their utility as corrosion-inhibitors.

U.S. Pat. No. 3,565,843 discloses organic rust-inhibiting compositions which form hard coatings which are almost tack-free to the touch by spraying on metal surfaces, which compositions comprise (a) about 10 to 35 wt. % of an inorganic-organic complex in the form of an overbased alkaline earth metal organic sulfonate which has been admixed with aqueous ammonia under conditions to form a gel, which is, in fact, a thixotropic gel; (b) about 5 to 15 wt. % of a coating material selected from the group consisting of a hydrocarbon polymer resin and a combination of a hydrocarbon polymer resin, an ethylene-vinyl acetate copolymer having a specified melt index, and a wax, and wherein said hydrocarbon polymer resin has a specified molecular weight and a specified softening point; and (c) about 55 to 85 wt. % of a hydrocarbon solvent having a boiling point range of about 270° to 450° F.

U.S. Pat. No. 3,661,622 discloses, among other subject matter, the preparation of thixotropic overbased alkaline earth metal, particularly calcium, organic sulfonates, complexed with an alkaline earth metal, particularly calcium, carbonate; the admixture therewith of certain polymers such as low density polyethylene, polypropylene, etc.; copolymers of the foregoing with vinyl monomers such as ethylene-vinyl acetate; polymethyl methacrylate and others; and the preparation of corrosion-inhibiting primer coating compositions containing the aforesaid ingredients. The inclusion of the polymers, as is pointed out in Column 11, Lines 45–65, serves, among other functions, to produce films which are harder, tougher and less tacky than primer compositions which do not contain such polymers. The primer compositions are stated to be desirably applied to metal surfaces to be coated in the form of a volatile organic solvent solution, said primer composition solution being applied by brush coating or by spraying, and evaporating the volatile organic solvent from the primer composition film, after which a conventional paint is applied.

U.S. Pat. No. 3,746,643 discloses viscous, high melting point corrosion or rust-inhibiting coating compositions for metals which comprise a solution in a volatile hydrocarbon solvent, such as Stoddard solvent, which solution may also contain some mineral oil, of an inorganic-organic complex in the form of a thixotropic overbased alkaline earth metal organic sulfonate complexed with an alkaline earth metal carbonate, and which coating composition contains certain proportions of microcrystalline wax. The novelty in this patent resides in the incorporation of microcrystalline wax into the composition, which imparts an unexpected marked increase in the resistance to rusting of dip-coated steel panels, as demonstrated by Weatherometer testing, over similar coating compositions not containing microcrystalline wax, or over similar coating compositions containing ordinary paraffin waxes.

U.S. Pat. No. 3,816,310 discloses methods for the preparation of coating compositions which have particular utility as rust-inhibitors, as well as rust-inhibitor greases. This patent discloses methods of preparing inorganic-organic complexes in the form of thixotropic overbased alkaline earth metal, particularly calcium, organic sulfonates, complexed with an alkaline earth metal, particularly calcium, carbonate, dissolved or dispersed in a nonvolatile carrier, such as mineral oils, or a volatile organic solvent, such as Stoddard solvent, or a mixture of nonvolatile carriers and volatile organic solvents. Compositions made in accordance with this patent can be applied, by spraying or painting, to a metal surface to coat said surface and protect it against rusting, and it is stated that such compositions have particular utility for rust-proofing automobile underbodies.

The foregoing patents disclose numerous sulfonic acids, containing at least about 12 aliphatic carbon atoms in the molecule, which can be employed in the preparation of the thixotropic overbased inorganic-organic complexes which are used in accordance with the production of the novel corrosion-inhibiting compositions of the present invention including, among others, natural sulfonic acids, aliphatic and aromatic sulfonic acids, petroleum sulfonic acids, sulfonic acids of alkylated aromatic hydrocarbons, the disclosures of such sulfonic acids in said patents being incorporated herein by reference. For reasons of economy and for other reasons, those which are particularly preferred, as noted herein, are the alkylbenzene sulfonic acids, comprising monoalkyl- and dialkyl-benzene sulfonic acids, and particularly mixed monoalkyl- and dialkylbenzene sulfonic acids in which the alkyl group or groups are linear or branched chain.

In addition to the disclosure in the aforementioned U.S. Pat. No. 3,925,087 of certain "SACI" products as commercial sources of products for or containing the known rust-inhibiting thixotropic inorganic-organic complexes in the preparation of the novel corrosion-inhibiting compositions of the present invention, there are also known to the art other "SACI" corrosion-inhibiting products which contain as an ingredient thereof thixotropic inorganic-organic complexes of the type which are disclosed in the particular "SACI" products which are referred to in U.S. Pat. No. 3,925,087 and which "SACI" products can also be used in the production of the novel corrosion-inhibiting compositions of the present invention. Such additional "SACI" products are disclosed in various Technical Data sheets dealing with various "SACI" products.

"SACI" 700 is the source of the thixotropic overbased inorganic-organic complexes used in all solvent/mineral oil dissolved "SACI" products, with the exception of "SACI" 760 (discussed below). With respect to products identified as "SACI"-100 and 100-A, "SACI"-200 and 200A, "SACI"-300 and 300A, "SACI"-2400, "SACI"-2452 and "SACI"-2460, they all have various levels of one or more waxes, oxidized petrolatums, mineral oils or other additives in conjunction with the thixotropic overbased inorganic-organic complexes found in "SACI" 700. All of these "SACI" products are capable of being formulated with both refined and unrefined waxes, petrolatums, resins, polymers, asphalts, oils, and aliphatic and aromatic solvents to achieve various levels of solids, activity, and/or viscosity.

"SACI" 760 is a colloidal dispersion in mineral spirits of a thixotropic overbased calcium organic sulfonate complexed with calcium carbonate. Said "SACI" 760 product contains 60 wt. % of said complex and 40 wt. % of mineral spirits. The thixotropic overbased inorganic-organic complex present in "SACI" 760 is less thixotropic than the thixotropic overbased inorganic-organic complex present in "SACI" 700. This allows bulk handling at higher solids levels of the thixotropic overbased inorganic-organic complex than in the case of "SACI" 700.

With further respect to the Technical Data sheets with respect to the aforesaid products identified as "SACI"-100 and 100A, "SACI"-200 and 200A, "SACI"-300 and 300A, "SACI"-2400, "SACI"-2452 and "SACI"-2460, except as noted hereafter, the aforesaid "SACI" products contain a thixotropic overbased calcium organic sulfonate complexed with calcium carbonate colloidally dispersed in a volatile hydrocarbon solvent (mineral spirits), or in a paraffinic mineral oil, or in a mixture of said mineral spirits and said mineral oil. The organic sulfonate part of the thixotropic overbased calcium organic sulfonate-calcium carbonate complexes of the aforesaid "SACI" products is derived from the use of branched chain or linear/straight chain monoalkylbenzene or dialkylbenzene sulfonic acids or mixtures of such sulfonic acids, the alkyl radical or radicals containing at least 12 carbon atoms and generally in the range of from 12 to 30 carbon atoms.

"SACI"-100 and 100A concentrates are colloidal dispersions of said complex in a mixture of mineral spirits and a paraffinic mineral oil. "SACI"-100A also contains oxidized petrolatum for improved anti-corrosion properties. "SACI"-100 contains 60, 50 or 40 wt. % solids, depending on its content of mineral spirits. Coatings made with its listed basic composition are generally stated to be formulated with waxes (refined and unrefined); petrolatums; oxidized petrolatums, those having an Acid No. of 15-20 being recommended; pigments; resins; and asphalts. Coatings made with "SACI"-100 and 100A concentrates are stated to produce films which are soft, oily and self-healing. Salt fog tests on "SACI"-100 and 100A show 500 hours to failure for "SACI"-100 and 600 hours to failure for "SACI"-100A with a dry film thickness of 0.5 mil; 1000 hours to failure for "SACI"-100, and 1200 hours to failure for "SACI"-100A with a dry film thickness of 1.0 mil.

"SACI"-200 and 200A are colloidal dispersions of said complex in a paraffinic mineral oil. "SACI"-200A contains 36 wt. % of said complex and 64 wt. % mineral oil. "SACI"-200A also contains oxidized petrolatum. The other statements made as to "SACI"-100 and 100A are applicable to "SACI"-200 and 200A.

"SACI" 300 is a colloidal dispersion of a thixotropic overbased inorganic-organic complex in mineral spirits containing about 35 wt. % of said complex and about 37 wt. % of said mineral spirits, with minor proportions of a microcrystalline wax and a paraffinic mineral oil to provide a corrosion-inhibiting composition which is stated to have exceptional protection properties in salt water immersion and salt atmospheres; that typical applications include outdoor parts storage, automobile body rust protection, coatings for underground pipe, marine applications and protection of overseas shipments; that "SACI" 300 wax-like coatings can be used in organic solvent dilutions or in combination with asphalts or petrolatums where long-term protection and relative ease of removal are important; and that the films resulting from using the basic formulation of SACI are firm and waxy. "SACI"-300A is similar to "SACI"-300; but it also contains oxidized petrolatum. Salt fog tests on "SACI"-300 and "SACI"-300A show, among other thicknesses of dry films, 300+ hours to failure for "SACI"-300 with an 0.5 mil dry film thickness and 800+ hours to failure with "SACI"-300A with the same film thickness; and, where the film thickness is 1.0 mil, 800+ hours to failure for "SACI"-300 and 1500+ hours to failure for "SACI"-300A. With films of 5.0 mil thickness, "SACI"-300 showed failure after 2000+ hours, and "SACI"-300A showed failure at 3000+ hours.

Other commercial "SACI" products are, as noted above, "SACI"-2400, "SACI"-2452 and "SACI"-2460. These "SACI" products are all corrosion-preventive concentrates in the form of mineral spirits-wax colloidal dispersions. They are stated to have a high content of the thixotropic inorganic-organic complex (65 wt. % solids in "SACI"-2400, 52 wt. % in "SACI"-2452, and 60 wt. % solids in "SACI"-2460). They are stated to be formulatable with both refined and unrefined waxes, petrolatums and oxidized petrolatums, resins, polymers, asphalts, oils, and aliphatic and aromatic solvents to achieve virtually any solids, activity and/or viscosity level desired. Salt fog data are presented utilizing dry film thicknesses of 0.5 mil and 1.0 mil, hours to failure with 0.5 mil being 500, and hours to failure with 1.0 mil being 1100.

"SACI" 700, referred to above, is a colloidal dispersion of said complex in mineral spirits, the solids content of which, namely, the thixotropic overbased complex, is substantially 50 wt. %, and the mineral spirits content of which is substantially 50 wt. %. It is stated in "SACI" 700 Technical Data sheets that the "SACI" 700 must be used with an added plasticizer or resin for effective protection; and, generally, that "SACI" 700 can be formulated with hydrocarbon resins, asphalts, waxes, mastics, petrolatums and oils to produce a variety of effective coatings. Also shown are the results of salt spray and humidity cabinet corrosion tests.

Another "SACI" product, also referred to above, is "SACI" 760, which is a colloidal dispersion in mineral spirits of a thixotropic overbased calcium organic sulfonate complexed with calcium carbonate. Said "SACI" 760 product contains 60 wt. % of said complex and 40 wt. % of mineral spirits. The organic portion of said organic sulfonate is derived from a linear alkylbenzene sulfonic acid. A suitable alkylate for the preparation of said sulfonic acid is sold under the trademark "PAL" 2 Alkylate (Exxon Co.).

SUMMARY OF THE INVENTION

Our present invention is based on discoveries that improved corrosion-inhibiting coating compositions can be obtained which produce firm or hard non-oily, or essentially non-oily, thin film protective coatings, free or essentially free of tack, on metal surfaces, and which coatings have a high permanence, by combining drying oils, driers, and thixotropic overbased alkaline earth metal organic sulfonates complexed with alkaline earth metal carbonates, in certain specified proportions, and most advantageously in conjunction with one, and particularly more than one, other ingredient. Whereas, in and according to the above-mentioned U.S. Pat. No. 3,925,087, satisfactory coatings are not obtained with drying oil contents above 10 wt. % of the corrosion-inhibiting compositions because higher proportions are stated to be believed to cause excessive cracking tendencies in the soft, oily coatings of the asserted invention of said patent, we have found that firm or hard essentially non-oily coatings which are free or substantially free from cracking, and are free or substantially free of tack, can be obtained with drying oil contents, particularly desirably with linseed oil as the drying oil, very substantially in excess of the upper limit of about 10% shown in said U.S. Pat. No. 3,925,087. Our corrosion-inhibiting compositions contain at least about 15 wt. % of the drying oil, and may contain as much as about 50 wt. %, particularly advantageously between about 25 to about 35 wt. %, in combination with said inorganic-organic complexes in amounts in the range of 10 to 40 wt. % of the said coating compositions.

While, in the broadest aspect of our invention, our coating compositions may contain only the drying oil, particularly linseed oil, and a drier, and the inorganic-organic complex colloidally dispersed in a liquid carrier or solvent or diluent, such as a volatile organic solvent, for instance, mineral spirits or Stoddard solvent; or a nonvolatile mineral oil solvent; or mixtures of said organic solvent with said nonvolatile mineral oil solvent in an amount or character such as not to form a soft or oily or tacky coating after drying or curing of the thin film coating, the most satisfactory coating compositions of our invention, as noted above, contain additional ingredients or additives as well. Among such additional ingredients or additives which are particularly advantageously included in our coating compositions are one or more, and particularly more than one, of the following: waxes, most desirably crude or refined microcrystalline waxes; polyethylene waxes (oxidized or unoxidized); petrolatums (oxidized or unoxidized); petroleum greases; asphalts; bitumens; epoxidized triglyceride oils, particularly epoxidized drying oils, especially epoxidized linseed oil, which have high oxirane contents; water-insoluble resins, but volatile organic solvent- or mineral oil-soluble or miscible resins of various types.

Supplemental ingredients can be added, such as colorants, semi-drying oils, wetting agents, surface slip agents, anti-skinning agents, etc.; but, if used, are employed in distinctly minor proportions, generally not exceeding about 2 or 3 wt. %. Where non-clear coatings are desirable, the use of extenders and/or pigments at levels upwards to about 10 wt. % are found to be advantageous in salt fog and QUV testing.

Certain of the coatings produced by the corrosion-inhibiting compositions of our invention are distinguished from the soft, oily, readily removable coatings by not only the very higher contents of drying oil than the upper limit of drying oil in the corrosion-inhibiting compositions of U.S. Pat. No. 3,925,087, but, also, in certain cases, by substantially reducing the proportions of mineral oils which are essential to obtaining the soft, oily, readily removable coatings according to the teachings of said patent. The films which can be made in accordance with our invention are obtainable, commonly with drying times of the order of about 24 hours, and are essentially free from the formation of cracks or skins at the preferred 6 mil dry film.

Generally speaking, in at least most instances, corrosion-inhibiting compositions made in accordance with our invention have improved corrosion resistance, as evidenced by salt spray, salt fog testing procedures, or accelerated weathering (i.e., QUV) over corrosion-inhibiting films made from overbased thixotropic inorganic-organic complexes which do not contain drying oils and driers. Particularly more significant is the improved film hardness, abrasion-resistance, and generally higher extent of permanence afforded a thixotropic overbased complex by the use of drying oils in the high proportions utilized according to the present invention.

It is to be understood that, generally speaking, and so far as we are aware, the novel corrosion-inhibiting compositions of our present invention constitute a definite improvement in one or more respects over coating compositions which have heretofore been prepared utilizing inorganic-organic complexes, as exemplified by coatings prepared from the heretofore-marketed "SACI" corrosion- or rust-inhibiting or preventive concentrate compositions, such as "SACI" 700; "SACI" 760; "SACI"-100 and 100A; "SACI"-200 and 200A; "SACI"-300 and 300A; "SACI"-2400; "SACI"-2452; "SACI"-2460; and other "SACI" concentrate compositions. Coating compositions heretofore made from or utilizing said "SACI" concentrates, to be sure, have excellent performance characteristics when used for various protective purposes. However, such "SACI" corrosion-inhibiting compositions have been found to be lacking in certain properties, especially film hardness and nonvolatile content, to reasonably meet certain requirements, especially in regard to particular automotive uses, as well as uses in other environments.

In various industries, and exemplified particularly by the automotive industry, it has long been a desideratum that corrosion-inhibiting compositions have low levels or contents of volatile organic solvents; or, better still, that such compositions contain no volatile organic solvents. Hot melt and waterbased technologies have been utilized toward that end, but both such approaches have met with certain problems. Hot melts are dipped or sprayed onto the metals to be protected against corrosion, but this approach involves the use of high temperatures, which create hazards for the work force; and, in addition, high initial investment capital has been required for new equipment needed to handle high temperatures. The use of waterbased corrosion-inhibiting compositions has also been less than adequately satisfactory because such compositions generally contain only 40 to 50% active corrosion-inhibiting ingredients, with the rest being primarily or largely water which, particularly in high humidity environments, is difficult to drive off in order to obtain a firm or hard film which will not re-emulsify.

Over and above the improvements which our present invention has made in corrosion-inhibiting compositions of the type which utilize thixotropic overbased inorganic-organic complexes, which render such compositions highly useful for reasonably meeting even more effectively corrosion problems which heretofore have been met by the "SACI" products described above, our invention has also moved an appreciable way towards arriving at corrosion-inhibiting compositions which possess a high (about 80% to about 95%) nonvolatile and which come reasonably close to meeting overall very rigid requirements of the automotive industry, including certain of the tests from General Motors Corrosion Inhibitor specifications, as will be noted hereafter.

For the purposes of the present invention, the nonvolatile weight percentages of a given corrosion-inhibiting composition, or a starting material for use in the preparation of corrosion-inhibiting compositions made in accordance with our present invention, as, for instance, the "SACI" products, is determined by taking a given weight of a particular composition, heating it (desirably in a closed oven or the like) at 225° F. for 2 hours, removing it from said oven, and then weighing the resulting so-heated composition. If, for instance, the original composition (before being placed in the oven and heated at 225° F. for 2 hours) weighed, say, 100 g, and, after removal from the oven, its weight was 80 g, the nonvolatile weight percentage of the original given (or starting) composition would be 80%.

In connection with the foregoing situations, it is in order to note that, while heretofore-known corrosion-inhibiting compositions which have utilized thixotropic overbased inorganic-organic complexes, as shown, for instance, in the "SACI" Technical Data sheets, are effective as corrosion-inhibiting coatings in various environments where corrosion is encountered, there are other properties which protective coatings must have, and other considerations come into play, in order to meet particular situations over and above corrosion-inhibition. Although "SACI" products and "SACI"-based corrosion-inhibiting compositions very effectively generally meet many situations, as noted above, there are certain environments in which their overall utility must be enhanced for them to meet or reasonably meet fully satisfactory use in said certain environments. Thus, it is important, for certain uses, and there is an increasing demand for certain uses, particularly in the automotive field, as noted above, for a reduction in solvent emissions in the use of automobile corrosion-inhibiting compositions. There is also a trend towards obtaining more abrasion-resistant films, which are deposited on metals by corrosion-inhibiting compositions. These considerations have involved the matter of attempting to produce corrosion-inhibiting compositions which have particularly high concentrations of solids, or of nonvolatiles, of the order of at least 70 wt. % nonvolatiles, and, more advantageously, of the order of 80 or 90 wt. % or even higher percentages of nonvolatiles, which can economically deposit reasonably satisfactory coatings on metals by such methods as spraying, and which produce harder or tougher protective coatings, with a minimum of organic solvent emissions by reason of the very high nonvolatile content of the corrosion-inhibiting compositions.

So far as we are aware, the use of inorganic-organic complexes, such as thixotropic overbased alkaline earth metal organic sulfonates complexed with alkaline earth metal carbonates, in corrosion-inhibiting compositions which have heretofore been known to the art, as exemplified by the above-mentioned patents and "SACI" Products Technical Data sheets, has found only limited acceptanc in the maintenance coatings field. Corrosion-inhibiting compositions such as constitute the invention of U.S. Pat. No. 3,925,087, generally speaking, have found very little acceptance in the maintenance industry, soft, oily, readily removable coatings being, generally, unsatisfactory. Various prior art coatings were too soft. Adhesion problems, and other problems as well, with typical maintenance coatings were encountered when known inorganic-organic complex coatings were used as primer coatings. In their more modified forms, our invention has displayed acceptable performance as a maintenance primer and/or topcoat.

The aforementioned U.S. Pat. No. 3,925,087 is irrelevant to the foregoing and related considerations because it teaches only the production of corrosion-inhibiting compositions which yield only soft, oily, readily removable films on metals on which they are coated and then dried or allowed to dry. This teaching of said patent has been confirmed by preparing formulations disclosed in said patent using 3 to 9 wt. % drying oil (tung oil); and, also, formulations using 3 to 9 wt. % drying oil (linseed oil) with a small percentage of driers such as are disclosed in said patent, said formulations containing almost 80 wt. % diluent oil. While a polymeric film was formed upon drying, it was soft and extremely oily, and readily removable by concentrated organic solvents as expressly stated by said patent. The corrosion-inhibiting formulations of said patent, as stated above, do not even come close to meeting various requirements of the automotive industry in regard to the properties of the coatings formed by such formulations.

As noted above, in the broadest aspect of our invention, the corrosion-inhibiting compositions may contain only the drying oil, drier, and the thixotropic, overbased alkaline earth metal organic sulfonate complexed with the alkaline earth metal carbonate colloidally dispersed in a carrier or diluent, as referred to above, and in which compositions the drying oil comprises from 15 to about 50 wt. %, the thixotropic overbased complex constituting from 10 to about 40 wt. %, and the drier or driers constituting a distinctly small proportion, generally of the order of about 0.3 to about 3.5 wt. %.

In the particularly preferred corrosion-inhibiting compositions of our invention, where one or more additive ingredients is utilized, the proportions of the additive ingredients of such compositions will generally fall within the ranges set forth below, in terms of wt. % of said compositions as a whole. It will be understood that, as noted above, only one of said additives may be used, but two or three, or more, of the additives may be used in any given corrosion-inhibiting composition, together with the thixotropic overbased alkaline earth metal organic sulfonate/alkaline earth metal carbonate complex, the drying oil, and the drier.

| PREFERRED ADDITIVE COMPONENTS AND WT. % THEREOF USED IN CORROSION-INHIBITING COMPOSITIONS | |
|---|---|
| Epoxidized Oils, Particularly Epoxidized Linseed Oil | 5–20, particularly 10–15 |
| Slack Wax, Crude And Refined | 5–20, particularly 10–15 |
| Microcrystalline Waxes | 5–20 particularly 10–15 |
| Petroleum Greases | 5–20, particularly 10–15 |
| Mineral Oils, Particularly Paraffins | 5–20 particularly 10–15 |
| Resins | 3–10 |

The following Table 1 illustrates several corrosion-inhibiting compositions or formulations and their corresponding salt fog test results. It is important to note that the presence of the listed additives gave equal or better salt fog results at half the film thickness for a somewhat similar composition containing the same amount of "SACI" 760, a somewhat smaller amount of linseed oil, and the same drier in the same proportions. With the stated additives, Blends 1, 2, 3 and 5 gave salt fog results which were very distinctly better than the composition or formulation without said additives; and Blend 4 gave the same salt fog results, at a film thickness of 0.5 Mil, as a composition of "SACI" 760 (100 parts by weight) and Linseed Oil (50 parts by weight) with the same drier and in the same parts by weight, but at a thickness of 1 Mil, namely, twice that of Blend 4.

TABLE 1

DRYING OIL/SACI ADDITIVES
The additives listed by blend below all utilized the same level of "SACI" 760, (100 parts by weight) and Linseed Oil (60 parts by weight). The blends contained, as the drier, 2.1 parts by weight of a mixture of cobalt naphthenate and zirconium octoate in a wt. ratio of 1:13.3.

| Blend | Additives | Parts (By Wt.) | 0.5 Mil S.F. | QUV 336 hrs 2 mils |
|---|---|---|---|---|
| 1 | Petrolatum ("SONO-JEL" #9) | 30 | 648 Hrs. | 65% Rust |
| 2 | Paraffinic Oil (200 Visc) | 25 | 456 Hrs. | 90% Rust |
| 3 | Paraffinic Oil (200 Visc) | 20 | 648 Hrs. | No Rust |
|   | Microcrystalline Wax (MI-445) | 20 | | |
| 4 | Paraffinic Oil (200 Visc) | 20 | 384 Hrs. | 15% Rust |
|   | Oxidized Petrolatum (Acid No. 15) | 20 | | |
| 5 | Paraffinic Oil (200 Visc) | 20 | 648 Hrs. | 2% Rust |
|   | Baytown Grease (Crude Wax) | 10 | | |

For general comparison, a combination of "SACI" 760 (100 parts by weight) and linseed oil (50 parts by weight), with the same drier and in the same parts by weight, gave 384 Hrs. salt fog at 1 mil film thickness, and displayed 80% rust after 350 Hrs QUV at a 2 mil film thickness. Furthermore, by way of comparison, "SACI" 760 by itself gave only 96 Hrs in the Salt Fog test at 1 mil film thickness, and after 120 Hrs QUV had 20% Rust.

Various inorganic-organic complexes in the form of thixotropic overbased alkaline earth metal, particularly calcium, organic sulfonates complexed with alkaline earth metal, particularly calcium, carbonate, can be used in accordance with our invention. Such inorganic-organic complexes are, as is well-known, water-insoluble but are colloidally dispersible in nonvolatile oils, most commonly mineral oils, naphthenic as well as paraffinic, and volatile organic solvents, most commonly of aliphatic or cycloaliphatic character. As previously noted, they are disclosed in the various patents referred to above. As has also been indicated above, the aforesafd complexes are most desirably derived from the use of branch chain or linear or straight chain monoalkylbenzene sulfonic acids or dialkylbenzene sulfonic acids, or mixtures of such sulfonic acids in which the dialkylbenzene sulfonic acids advantageously predominate, and the alkyl groups of which contain predominately from 12 to 30 carbon atoms. One of such well-known sources is the material commonly called "postdodecylbenzene" sulfonate, which is a sulfonic acid of a bottoms product from the manufacture of dodecylbenzene in which the alkyl groups are branch chain, and another is a sulfonic acid of a generally corresponding bottoms product but in which the alkyl groups are linear or straight chain and which bottoms are commonly known as "NAB" bottoms. These inorganic-organic complexes, in the case of the calcium compounds, are commonly characterized by the formula $(RSO_3)_2Ca:CaCO_3$, where R is an alkylbenzene radical of the foregoing type. A broader formula is shown, for instance, in the aforementioned U.S. Pat. No. 3,453,124, which discloses thixotropic alkaline earth metal organic sulfonate/alkaline earth metal carbonate complexes which are useful in the preparation of the corrosion-inhibiting compositions of our present invention. Those inorganic-organic complexes which are particularly useful in the practice of our invention have base numbers in the range of about 200 to 350; or, stated in terms of their metal ratios, they have metal ratios of at least 4.5, and particularly in the range of about 7 to about 12. Although any thixotropic overbased calcium sulfonate/calcium carbonate complex is acceptable or reasonably satisfactory in the production of the novel corrosion-inhibiting compositions of our present invention, particularly advantageous is "SACI" 760 due to, as mentioned above, its lower thixotropy which allows the preparation of reasonable viscosity high solids corrosion-inhibiting compositions in accordance with the broader teachings of our present invention.

With respect to the drying oils, while any drying oils, generally speaking, are usable to at least some extent in the coating compositions of our invention, linseed oil is especially suitable. Other drying oils which have relatively similar properties can be used wholly in place of or in admixture with linseed oil, as, for example, walnut oil, and dehydrated castor oil. Other drying oils are oiticica oil, tall oil, fish oils and synthetic unsaturated oils. The natural oils can be used as well as modified drying oils such as blown, heat bodied, polymerized and isomerized oils. Especially satisfactory is natural linseed oil.

In those instances in which the coating compositions of the present invention contain particularly high contents of drying oils, for instance, of the order of about 30 to about 40 wt. % of the corrosion-inhibiting compositions, it is particularly advantageous not to use tung oil as the drying oil although whether linseed oil or tung oil is used makes essentially no difference so far as improvements in corrosion-inhibition is concerned, the results as to salt spray tests being generally comparable. However, as has been indicated above, salt spray test results using thin film coatings are by no means the sole criterion for an effective and marketable corrosion-inhibiting composition. It has been found by us that, in such high solids corrosion-inhibiting compositions of our invention, and using film coating thicknesses in the range of about 4 to about 6 mils, which is required in certain applications, if tung oil is used as the drying oil, the surfaces of films of such thickness cure too quickly. The result is that an unsightly wrinkling of the film occurs. Furthermore, the curing of the film surface which takes place relatively quickly when tung oil is used as the drying oil also results in preventing oxygen from reaching the lower parts of the film, which prevents or very unduly prolongs the film from curing throughout its thickness. Using linseed oil, or other drying oils such as, for instance, walnut, which functions very much like linseed oil, under the foregoing situation, the "wrinkling" phenomenon is avoided, and, in addition, the film cures throughout its thickness. In such usage environment, it may be noted that tung oil, and other drying oils which cause film wrinkling, can be used in admixture with linseed oil without film wrinkling occurring, provided that the tung oil or similar wrinkle-causing drying oil is utilized in distinctly minor proportions, generally not exceeding about 20% of the mixture thereof with linseed oil.

The driers which are utilized in the corrosion-inhibiting compositions of our invention are conventional driers which, typically, are of the paint drier type. They are, generally speaking, polyvalent, usually divalent, metal salts of soap-forming carboxylic acids. Illustrative examples of such driers are naphthenates, tallates, and octoates of such metals as cobalt, zirconium, lead, nickel, zinc, chromium and manganese, or mixtures of two or more of such driers. We prefer to use mixtures of cobalt naphthenates and zirconium octoates. The drier is used in distinctly small proportions, generally in the range of about 0.3 to about 2 wt. % of the corrosion-inhibiting composition, the amount depending, in part, on the wt. % of drying oil used in any given corrosion-inhibiting composition or formulation.

Where mineral oils are utilized in the preparation of the coating compositions of our invention, such mineral oils can be naphthenic or paraffinic, the latter being preferable. Their viscosities may vary appreciably as, for instance, from about 60 SUS @100° F. to about 2000 SUS at 100° F., a preferred range being about 200 to 300 SUS at 100° F. They are generally characterized as neutral oils. In those instances in which, in accordance with a narrower aspect of our invention, neutral oils are used in conjunction with high levels of drying oils, particularly linseed oil, with the thixotropic overbased alkaline earth metal organic sulfonates complexed with alkaline earth metal carbonate in the coating compositions made in accordance with our invention, such neutral oils serve a number of advantageous purposes. They inhibit the drying oils from over-curing and embrittling the resulting coatings. The neutral oils also aid in imparting optimal viscosity reduction and low fugitivity to the coating compositions, and serve to provide a sprayable viscosity while still permitting a desired high level of solids in the coating compositions. Compatibility between the high contents of drying oil and the thixotropic overbased complexes is also improved. Furthermore, the neutral oils are able to bleed out of a cured film of the coating compositions of our invention and inhibit or prevent corrosion in a damaged or potentially damaged area of the metal surface; they also increase rust prevention by lowering the water sensitivity of the system, and they increase the metal wetting and seam penetration properties of the coating compositions of our invention. The mineral oils, should, generally speaking, not exceed about 20 wt. % of the corrosion-inhibiting compositions as a whole and are preferably used in amounts of 5-15 wt. %.

The volatile organic solvents which, in certain embodiments of our invention are utilized, can be of aliphatic, cycloaliphatic or aromatic character, and include hydrocarbons, chlorinated hydrocarbons, alcohols, ketones and ethers which are compatible in the system. Preferred volatile organic solvents are aliphatic solvents, especially suitable being odorless mineral spirits because of its low toxicity and relatively low cost as well as its advantageous flash point. Other volatile organic solvents which can be used are disclosed in the above-mentioned U.S. Pat. No.3,453,124, in Column 3, the disclosure of which volatile solvents is herein incorporated by reference. In the case of corrosion-inhibiting compositions of our invention which contain a relatively high level of modifying resins, volatile organic solvents having stronger solvent properties than mineral spirits are sometimes required. In such cases, volatile organic solvents with high aromaticity are used. They are generally used in amounts of about 5 to 20 wt. % of the corrosion-inhibiting compositions as a whole.

The epoxidized oils which are advantageously used in the best embodiments of the corrosion-inhibiting compositions made in accordance with our invention are, per se, well-known to the art; but, so far as we are aware, they have not been used in corrosion-inhibiting compositions such as those of our present invention. When so used, they serve to promote compatibility and to improve flexibility of the coatings on metals and, also, to enhance the adhesion of the coatings to the metal surfaces. They have little effect on salt fog performance. Illustrative epoxidized oils are those prepared by the epoxidation of triglyceride oils, including semi-drying oils, and, particularly, drying oils of natural or synthetic character, among which are tung oil, dehydrated castor oil, corn oil, cottonseed oil, soya bean oil, walnut oil, and fish oils. Particularly satisfactory is epoxidized linseed oil, exemplified by the product sold under the trademark "DRAPEX" (Argus Chemical Corporation), in which the epoxide equivalent is 10.4. It is preferred to use epoxidized oils which have high oxirane contents. They are advantageously utilized in proportions of about 5 to 20, particularly about 5 to 15, wt. % of the corrosion-inhibiting compositions as a whole.

Petrolatums and/or oxidized petrolatums, and, also, microcrystalline waxes and slack wax, crude and refined, as noted above, can be and desirably are used in the corrosion-inhibiting compositions of our invention. They are all, per se, well-known to the art and require no extensive elaboration as to what they are. Petrolatums and oxidized petrolatums may be defined, respectively, as purified mixtures of semisolid hydrocarbons derived from petroleum and their oxidation products.

Microcrystalline waxes may be defined as higher melting point waxes purified from petrolatums.

As to the oxidized petrolatums, various procedures for the preparation thereof are, per se, known to the art; and various of them are well-known articles of commerce, illustrative of which are those sold by ALOX Corporation under ALOX Nos. 100D, 102, 600 and 601. Those oxidized petrolatums where the extent of oxidation is such as to provide acid numbers in the range of about 10 to 130 are most suitable, particularly useful for the purposes of the present invention being those oxidized petrolatums having acid numbers in the range of 15 to 60. The petrolatums from which the oxidized petrolatums are derived are, most advantageously, natural petrolatums, that is, those produced from petroleums, but, also, oxidized petrolatums can be utilized which are derived from synthetic petrolatums. Such latter oxidized petrolatums, as such, are also known to the art. Where reference is made in the claims to oxidized petrolatum, it will, therefore, be understood to encompass oxidized petrolatums wherein the petrolatums, prior to being oxidized, are derived from natural or synthetic sources. The product sold under the trademark "SOCCO-R-H-15" (Metal Lubricants Co., Harvey, Ill.) is illustrative of a synthetic oxidized petrolatum which is derived from a mixture of fatty acids and petrolatum and is used and sold for use in formulations of rust preventatives and is blended with metal or synthetic sulfonates to produce corrosion inhibitors which are stated to be highly effective. Oxidized natural petrolatums will be understood to mean petrolatums which, prior to being oxidized, are derived from petroleums.

The petrolatums, the oxidized petrolatums, and the microcrystalline wax act, in certain respects, generally similarly to the neutral oils. The higher molecular weight of such materials makes their effects much longer timewise than neutral oils, but their self-healing properties are not as great as those of neutral oils. The proportions of each of the petrolatums, the oxidized petrolatums, and the microcrystalline wax are most advantageously in the range of 5 to 10 wt. % of the corrosion-inhibiting compositions as a whole, but can be appreciably greater, for instance, up to about 20 wt. % of the corrosion-inhibiting compositions as a whole.

Resins, which are advantageously used in the corrosion-inhibiting compositions of our invention, can be of diversified types. Those which are used are water-insoluble and soluble or readily dispersible in various volatile organic solvents or mineral oils or mixtures of volatile organic solvents and mineral oils which comprise liquid carriers which are used in the preparation of various of the corrosion-inhibiting compositions of our invention. They include, by way of illustration, hydrocarbon resins (petroleum and non-petroleum), unmodified or modified, and sold under such trademarks as "PICCOPALE" (Hercules, Inc.) "BETAPRENE" (Reichhold Chemical Company); and alkyd resins such as those sold under the trademarks "BECKOSOL" (Reichhold Chemical Company), and "AROPLAZ"for example, "AROPLAZ" 1266-M-60, 1266-M-70 and 1271 (Ashland Chemical Company); epoxy ester resins such as those sold under the trademarks "EPOTUF" (Reichhold Chemical Company); oil-modified polyurethane resins such as those sold under the trademark "UROTUF" (Reichhold Chemical Company); and thermoplastic resins of various types such as acrylic resins and some of which are sold under the trademark "ACRYLOID"-acrylic resins (Rohm & Haas Co.); and vinyl resins such as those sold under the trademark "GEON" (B. F. Goodrich Chemical). The proportions of the resins are variable, but it is preferred that they be used in amounts ranging from about 3 to about 10 wt. % of the corrosion-inhibiting compositions as a whole.

No novelty is claimed by us in corrosion-inhibiting compositions which comprise colloidal dispersions in volatile organic solvents, or in nonvolatile mineral oils, or in mixtures of volatile organic solvents and nonvolatile mineral oils, which compositions also contain petrolatums, or oxidized petrolatums, or microcrystalline waxes, or hydrocarbon resins, except to the extent that there is incorporated into such compositions drying oils, and particularly linseed oil, in amounts constituting from about 15 to about 50 wt. %, and especially from about 25 to about 35 wt. %, based on the weight of the corrosion-inhibiting compositions, and wherein, together with said drying oils in said proportions, said corrosion-inhibiting compositions also contain, by weight, from about 10 to 40 wt. %, especially from about 25 to about 35 wt. %, of the thixotropic overbased inorganic-organic complexes.

DETAILED DESCRIPTION

The following examples of corrosion-inhibiting coating compositions made in accordance with the present invention are given by way of illustration only and not by way of limitation as numerous other compositions can readily be prepared in light of the teachings and guiding principles disclosed above. All parts listed are by weight. They include preferred embodiments of the invention. We consider Examples 11 and 12 as constituting, generally, the best embodiments of our invention. It is to be understood that compositions which function best in certain environments may not necessarily be the best when used in other environments. Overall, what has been set forth above as being considered the best embodiments of our invention is, generally speaking, correct.

In those Examples (Nos. 1-10) in which reference is made to "Complex", such represents the inorganic-organic complex per se as is present in "SACI"-700 or "SACI" 760.

From what has been set forth above as to composition of "SACI" 700 and "SACI" 760, the evaporation of the mineral spirits results in leaving only the inorganic-organic complex per se. Where "SACI" products are used as starting materials for the preparation of the corrosion-inhibiting compositions of our invention, and where such "SACI" products contain mineral spirits and/or mineral oil, and where they contain microcrystalline wax and/or oxidized petrolatum, these ingredients and the amounts thereof must be taken into account in arriving at any particular corrosion-inhibiting composition or formulation desired to be made in accordance with our invention. There is, of course, no requirement whatsoever that "SACI" products as heretofore or presently commercially marketed be used as starting materials for the preparation of the corrosion-inhibiting compositions of our present invention. The starting thixotropic overbased inorganic-organic complexes as such, or per se, and as indicated above, can be made as described in various of the aforementioned patents such as, for instance, U.S. Pat. Nos. 3,453,124; 3,492,231; and 3,816,310.

The "Drier" referred to in the Examples is a mixture of cobalt naphthenate and zirconium octoate in a wt.ratio of 1:13.3.

In the following Examples of illustrative corrosion-inhibiting compositions made in accordance with our invention, salt spray tests were run according to ASTM B-117 using Q-panels coated with a 3.5 mil dry film of said compositions. Some coated panels were scribed down the center of the panel, while others were coated and tested for "face rust". The scribed panels were run for 500 hours in a Harshaw spray apparatus containing 5% salt solution. Failure is defined when more than 3 mm creep by rust from the scribe line occurs. Panels examined for "face rust" were run in a similar apparatus for 1,000 hours. Failure was determined to occur when three spots, each of one millimeter in diameter, were seen visually.

The order of the mixing or blending of the ingredients is not critical, any convenient orders of addition being generally satisfactory and being determined by the skill of one having ordinary skill in the art. When, in the preparation of the corrosion-inhibiting compositions of our invention, stripping of volatile organic solvent is desired to be carried out, blending order is necessary only to exclude the epoxidized oils and the driers from the stripping operation; and, after the stripping, then to add the epoxidized oil and the drier. The heat reached during stripping would cause gelling if the epoxidized oil and/or the drier were present in the composition when the stripping step was carried out.

EXAMPLE 1

|  | Parts |
|---|---|
| Complex | 31.4 |
| Linseed Oil | 30.2 |
| Mineral Spirits | 13 |
| Paraffinic Oil (200 Visc) | 20 |
| Oxidized Petrolatum (Acid No. 15) | 5 |
| Drier | 0.4 |
| Performance: | Scribe test @ 3.5 mil dry showed no creepback from scribe. Face rust test @ 3.5 mil dry showed pass with slight face rust. |

EXAMPLE 2

|  | Parts |
|---|---|
| Complex | 32.1 |
| Linseed Oil | 38.5 |
| Mineral Spirits | 11.4 |
| Paraffinic Oil (200 Visc) | 12.4 |
| Oxidized Petrolatum (Acid No. 15) | 5 |
| Drier | 0.6 |
| Performance: | Scribe test @ 3.5 mil dry showed no creepback from scribe. Face rust test @ 3.5 mil dry showed no face rust. 1 mil S.F. 1128 hrs |

EXAMPLE 3

|  | Parts |
|---|---|
| Complex | 31.3 |
| Linseed Oil | 31.3 |
| Mineral Spirits | 20.9 |
| Petrolatum (Acid No. 15) | 15.7 |
| Drier | 0.8 |
| Performance: | Scribe test @ 3.5 mil dry showed no creepback from scribe. Face rust test @ 3.5 mil dry showed no rust. 1 mil S.F. 1700 Hrs Passes GM SCRIBE/ADHESION TEST QUV 1.5% Rust @ 336 hrs 2 mil film |

EXAMPLE 4

|  | Parts |
|---|---|
| Complex | 28.4 |
| Linseed Oil | 28.4 |
| Mineral Spirits | 18.9 |
| Epoxidized Linseed Oil ("DRAPEX" 10.4) | 9.5 |
| Crude Microcrystalline Wax | 7.1 |
| Paraffinic Oil (200 Visc) | 7.1 |
| Drier | 0.6 |
| Performance: | Scribe test @ 3.5 mil dry showed no creepback from scribe. Face rust test @ 3.5 mil dry showed no rust. 1 mil S.F. 2700 hrs Passes GM SCRIBE/ADHESIVE TEST QUV 10% Rust @ 500 hrs 2 mil film |

EXAMPLE 5

|  | Parts |
|---|---|
| Complex | 28.4 |
| Linseed Oil | 26 |
| Mineral Spirits | 17.3 |
| Toluene | 3.5 |
| Epoxidized Linseed Oil ("DRAPEX" 10.4) | 8.7 |
| Crude Microcrystalline Wax | 6.5 |
| Paraffinic Oil (200 Visc) | 6.5 |
| Hydrocarbon Resin | 5.2 |
| Drier | 0.3 |
| Performance: | Scribe test @ 3.5 mil dry showed no creepback from scribe. Face rust test @ 3.5 mil dry showed no rust. 1 mil S.F. 980 hrs Fails GM SCRIBE/ADHESION TEST |

EXAMPLE 6

|  | Parts |
|---|---|
| Complex | 25.1 |
| Linseed Oil | 25.1 |
| Mineral Spirits | 16.7 |
| Epoxidized Linseed Oil | 10.5 |

|  | -continued |
|---|---|
| ("DRAPEX" 10.4) | |
| Crude Microcrystalline Wax | 6.3 |
| Paraffinic Oil (200 Visc) | 6.3 |
| Alkyd Resin | 9.6 |
| Drier | 0.4 |

Performance: Scribe test @ 3.5 mil dry showed no creepback from scribe.
Face rust test @ 3.5 mil dry showed no rust.
1 mil S.F. 2500 Hrs
Passess GM SCRIBE/ADHESION TEST
QUV 376 hrs No Rust 2 mil film

EXAMPLE 7

|  | Parts |
|---|---|
| Complex | 17.3 |
| Linseed Oil | 43.2 |
| Paraffinic Oil (200 Visc) | 25.9 |
| Crude Microcrystalline Wax | 6.5 |
| Epoxidized Linseed Oil ("DRAPEX" 10.4) | 6.5 |
| Drier | 0.6 |

Performance: Scribe test @ 3.5 mil dry showed no creepback from scribe.
Face rust test @ 3.5 mil dry showed no rust.
1 mil S.F. 1400 Hrs
Fails GM SCRIBE/ADHESION TEST
QUV 3% Rust @ 430 hrs 2 mil film

EXAMPLE 8

|  | Parts |
|---|---|
| Complex | 29.3 |
| Linseed Oil | 29.3 |
| Mineral Spirits | 21.5 |
| Paraffinic Oil (200 Visc) | 9.8 |
| Crude Microcrystalline Wax | 4.9 |
| Aluminum Metal Powder | 4.5 |
| Drier | 0.7 |

Performance: Scribe test @ 3.5 mil dry showed no creepback from scribe.
Face rust test @ 3.5 mil dry showed no rust.
1 mil S.F. 2300 Hrs
Fails GM SCRIBE/ADHESION TEST
QUV No Rust @ 569 hrs 2 mil film

EXAMPLE 9

|  | Parts |
|---|---|
| Complex | 26.5 |
| Linseed Oil | 26.5 |
| Mineral Spirits | 19.6 |
| Epoxidized Linseed Oil ("DRAPEX" 10.4) | 8.8 |
| Crude Microcrystalline Wax | 6.6 |
| Paraffinic Oil (200 Visc) | 6.6 |
| Aluminum Metal Powder | 4.6 |
| Drier | 0.7 |

Performance: Scribe test @ 3.5 mil dry showed no creepback from scribe.
Face rust test @ 3.5 mil dry showed no rust.
1 mil S.F. 2200 Hrs
Passes GM SCRIBE/ADHESION TEST
QUV No Rust @ 800 hrs 2 mil film

EXAMPLE 10

|  | Parts |
|---|---|
| Complex | 25.8 |
| Linseed Oil | 25.8 |
| Mineral Spirits | 18.7 |
| Epoxidized Linseed Oil ("DRAPEX" 10.4) | 8.6 |
| Crude Microcrystalline Wax | 6.4 |
| Paraffinic Oil (200 Visc) | 6.4 |
| Moly Orange | 6.3 |
| Alkyd Resin | 1.2 |
| Drier | 0.8 |

Performance: Scribe test @ 3.5 mil dry showed no creepback from scribe.
Face rust test @ 3.5 mil dry showed no rust.
1 mil S.F. 3200 Hrs
Passes GM SCRIBE/ADHESION TEST
QUV No Rust @ 970 hrs 2 mil film

EXAMPLE 11

|  | Parts |
|---|---|
| "SACI" 760 | 100 |
| Linseed Oil | 60 |
| Slack Wax | 15 |
| Paraffinic Oil (200 Visc) | 15 |
| Epoxidized Linseed Oil ("DRAPEX" 10.4) | 15 |
| Drier | 2.15 |

NOTE: 80% Nonvolatile Composition
Performance: Scribe test @ 3.5 mil dry showed no creepback from scribe.
Face rust test @ 3.5 mil dry showed no rust.

| | |
|---|---|
| QUV at 2 mil film 380 Hrs | 15% rust |
| Nonvolatile | 80.3 |
| Viscosity at 77° F. | 8,000 |
| Salt Fog at 1 mil | 1400 hrs. |
| GM SCRIBE/ADHESION TEST, 3,5 mil DFT | Slight rust in scribe, |
| 500 hrs. Salt Fog[1] | passes blow-off |
| Gravelometer[1] | Good - |
|  | Rust in ½ marks |
| 2.0 mil DFT, 336 hrs S.F. | Slight rundown |
| Fisher Body Immersion[1] | Marginal |
| Cold Mandrel Flex (−20° F.) | Pass |
| Adhesion/toughness | Good |
| Drytime | 24 hrs |

[1]Standard tests from General Motors

-continued

Automotive Corrosion Inhibitor specifications.

EXAMPLE 12

| | Parts |
|---|---|
| "SACI" 760 | 100 |
| Linseed Oil | 74 |
| Slack Wax | 19 |
| Paraffinic Oil (200 Visc) | 19 |
| Epoxidized Linseed Oil ("DRAPEX" 10.4) | 19 |
| Oil-Modified Polyurethane | 15 |
| Drier | 3.22 |
| NOTE: | Stripped to 95% Non-Volatile Composition |
| Performance: | Scribe test @ 3.5 mil dry showed no creepback from scribe. Face rust test @ 3.5 mil dry showed no rust. |
| QUV 2 mil 504 hrs | No rust |
| Nonvolatile | 95 |
| Viscosity at 77° F. | 18,000 cps |
| Salt Fog at 1 mil | 930 hrs. |
| GM SCRIBE/ADHESION TEST 3.5 mil DFT | Slight rust in scribe, |
| 500 hrs. Salt Fog | blow-off passes |
| Gravelometer | Good - Rust in 10% of marks Rundown Fair |
| Face Rust 2.0 mil DFT, 336 hrs S.F. | Slight rundown |
| Fisher Body Immersion | Marginal |
| Cold Mandrel Flex (−20° F.) | Pass |
| Adhesion/toughness | Fair |
| Drytime | 24 hrs |

POSITIVE PERFORMANCE AND FOREGOING SPECIFICATIONS RE EXAMPLES 11 AND 12

(A) The positive performance and meeting of specifications of Examples 11 and 12 are the high nonvolatile content (80% to 95%); the viscosities (8,000 and 18,000, and relatively stable); the Salt Fog tests, 600 and 850 hrs.; the Scribes (3.5 mil, 500 hrs.) the Passes and GM SCRIBE ADHESION, slight rust in scribe; Gravelometer, Good—(rust in ¼ marks) slight rundown; the Flex (−20° F.), Pass; Adhesion and Hardness, Good in Example 12 and various other Examples; Solvent Resistance—Will withstand soaking in mineral spirits/heptane for a week or more, but will not withstand stronger solvents. Good QUV results.

(B) The negative performance and potential problems are Dry Time: 20-24 hrs. dry through, 48-72 hrs. to obtain maximum set; in temperatures below 50° F. dry time is considerably retarded[2]; Fisher Body Immersion Test, fails, softening and loss of top layers of film; no blistering or rust, and remaining film does recover; maximum application of thickness of 6 to 7 mils, thicker films have dry-through problems; high water absorption; the matter of the weight % of water gained by a coating after 4 days' immersion in fresh water maintained at 158° F.; rusted creep-borderline @ about 80% nonvolatile, passes @70% nonvolatile. Overall, we presently consider that the corrosion-inhibiting composition of Example 12 to represent the best embodiment of our invention considering the particular uses for which it is intended.

2. In some applications, these properties may be desirable.

Note: Other Examples of corrosion-inhibiting compositions made according to our invention and having high contents of nonvolatiles were, overall, less satisfactory than the compositions of Examples 11 and 12. However, compositions made in accordance with Examples 11 and 12 and other compositions made having high contents of nonvolatiles are effective for various other corrosion-inhibiting uses and are superior to various "SACI" products and various other thixotropic overbased inorganic-organic complex corrosion-inhibiting compositions heretofore known to the art.

We claim:

1. A corrosion-inhibiting composition including, as essential ingredients, (a) an inorganic-organic complex in the form of a thixotropic overbased alkaline earth metal organic sulfonate complex with an alkaline earth metal carbonate colloidally dispersed in a carrier selected from the group of volatile organic solvents, mineral oils, and mixtures of said volatile organic solvents and mineral oils, (b) a drying oil, and (c) a drier, said thixotropic overbased alkaline earth metal organic sulfonate complex with an alkaline earth metal carbonate constituting from about 10 to about 40 wt. % of said corrosion-inhibiting composition, and said drying oil constituting from about 15 to about 50 wt. % of said corrosion-inhibiting composition, said corrosion-inhibiting composition, after application in the form of a thin film on a metal surface and drying, forming a hard essentially non-oily coating.

2. A composition according to claim 1, in which the alkaline earth metal is calcium.

3. A composition according to claim 1, in which the drying oil is linseed oil.

4. A composition according to claim 3, in which the inorganic-organic complex is a calcium organic sulfonate complex with calcium carbonate and in which the organic part is an alkylbenzene in which alkyl contains from 12 to 30 carbon atoms.

5. A composition according to claim 4, which includes from about 5 to about 15 wt. %, based on the weight of said composition, of an epoxidized oil.

6. A composition according to claim 5, in which the epoxidized oil is epoxidized linseed oil.

7. A composition according to claim 4, which includes from about 5 to about 15 wt. %, based on the weight of said composition, of a member selected from the group of slack wax and microcrystalline wax.

8. A composition according to claim 4, in which the carrier is mineral oil and in which said mineral oil is present in amounts from about 5 to about 15 wt. %, based on the weight of the composition.

9. A composition according to claim 8, in which the mineral oil is a paraffinic oil.

10. A composition according to claim 4, which includes from about 3 to about 10 wt. % of a resin, based on the weight of the composition.

11. A composition according to claim 10, in which the resin is selected from the group of unmodified hard hydrocarbon resins, modified hard hydrocarbon resins, epoxy resins, alkyd resins, oil-modified alkyd resins, oil-modified polyurethane resins, acrylic resins, vinyl resins, thermoplastic resins, and convertible resins.

12. A high solids corrosion-inhibiting composition including (a) an inorganic-organic complex in the form of a thixotropic overbased calcium organic sulfonate/calcium carbonate complex in which the organic part is an alkylbenzene in which alkyl contains from 12 to 30 carbon atoms, said complex being colloidally dispersed in a carrier selected from the group of volatile organic solvents, mineral oils, and mixtures of said volatile organic solvents and mineral oils, (b) linseed oil, (c) a drier, said thixotropic overbased calcium organic sulfonate/calcium carbonate complex constituting from about 25 to about 35 wt. % of said corrosion-inhibiting composition, and said linseed oil constituting from about 25 to about 35 wt. % of said corrosion-inhibiting composition, said high solids corrosion-inhibiting composition, after application in the form of a thin film on a metal surface and drying, forming a hard essentially non-oily coating.

13. A composition according to claim 12, which includes at least one ingredient selected from the group of petrolatum and oxidized petrolatum; petroleum grease; microcrystalline wax; and water-insoluble, organic solvent-and mineral oil-soluble resin.

14. A composition according to claim 13, in which the petrolatum or oxidized petrolatum is present in proportions from about 5 to about 15 wt. % of said composition as a whole.

15. A composition according to claim 13, in which the petroleum grease is Baytown grease and is present in proportions from about 5 to about 15 wt. % of said composition as a whole.

16. A composition according to claim 13, in which the microcrystalline wax is present in proportions from about 5 to about 15 wt. % of said composition as a whole.

17. A composition according to claim 12, which includes epoxidized linseed oil in proportions from about 5 to about 15 wt. % of said composition as a whole.

18. A composition according to claim 13, in which the resin is selected from the group of unmodified hard hydrocarbon resins, modified hard hydrocarbon resins, epoxy resins, alkyd resins, oil-modified alkyd resins, oil- or alkyd-modified polyurethane resins, acrylic resins, vinyl resins, thermoplastic resins, and convertible resins, and which resin is present in proportions from about 3 to about 10 wt. % of said composition as a whole.

19. A corrosion-inhibiting composition including (a) an inorganic-organic complex in the form of a thixotropic overbased calcium organic sulfonate/calcium carbonate complex in which the organic part is an alkylbenzene in which alkyl contains from 12 to 30 carbon atoms, said complex being colloidally dispersed in a carrier selected from the group of volatile organic solvents, mineral oils, and mixtures of said volatile organic solvents and mineral oils, (b) linseed oil, (c) a drier, said thixotropic overbased calcium organic sulfonate/calcium carbonate complex constituting from about 25 to about 35 wt. % of said corrosion-inhibiting composition, and said linseed oil constituting from about 25 to about 35 wt. % of said corrosion-inhibiting composition, said mineral oils being paraffinic and which are present in a proportion of about 5 to about 20 wt. %, (d) at least one ingredient selected from the group of petrolatum, oxidized petrolatum, microcrystalline wax and slack wax which is present in a proportion of about 5 to about 20 wt. %, and (e) an epoxidized drying oil which is present in a proportion of about 5 to about 20 wt. %, said percentages being based upon the composition as a whole, the nonvolatile content of said composition being at least 70%, said corrosion-inhibiting composition, after application in the form of a thin film on a metal surface, forming a hard essentially non-oily coating.

20. A method for inhibiting the corrosion of a metal surface which comprises depositing on said surface a film of the composition of claim 1 and then drying said film.

21. A method for inhibiting the corrosion of a metal surface which comprises depositing on said surface a of the composition of claim 19 then drying said film.

22. A metal article which has been protected against corrosion by the deposit on the surface thereof the composition of claim 1, followed by drying of said composition.

23. A metal article which has been protected against corrosion by the deposit on the surface thereof the composition of claim 19, followed by drying of said composition.

* * * * *